(12) United States Patent
Guo et al.

(10) Patent No.: US 11,600,810 B2
(45) Date of Patent: Mar. 7, 2023

(54) ULTRATHIN LITHIUM COMPOSITE AND PREPARATION METHOD AND USE THEREOF

(71) Applicant: INSTITUTE OF CHEMISTRY, CHINESE ACADEMY OF SCIENCES, Beijing (CN)

(72) Inventors: Yuguo Guo, Beijing (CN); Shuhua Wang, Beijing (CN); Wei Dong, Beijing (CN); Yaxia Yin, Beijing (CN); Chunru Wang, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 183 days.

(21) Appl. No.: 16/770,023

(22) PCT Filed: Dec. 21, 2017

(86) PCT No.: PCT/CN2017/117743
§ 371 (c)(1),
(2) Date: Jun. 4, 2020

(87) PCT Pub. No.: WO2019/109398
PCT Pub. Date: Jun. 13, 2019

(65) Prior Publication Data
US 2021/0167359 A1    Jun. 3, 2021

(30) Foreign Application Priority Data
Dec. 4, 2017 (CN) .......................... 201711260364.3

(51) Int. Cl.
*H01M 4/134* (2010.01)
*H01M 4/04* (2006.01)
*H01M 4/1395* (2010.01)

(52) U.S. Cl.
CPC ......... *H01M 4/134* (2013.01); *H01M 4/0416* (2013.01); *H01M 4/1395* (2013.01)

(58) Field of Classification Search
None
See application file for complete search history.

(56) References Cited

U.S. PATENT DOCUMENTS

| 4,911,995 A | 3/1990 | Belanger et al. |
| 2014/0287305 A1* | 9/2014 | Wachsman .......... H01M 10/054 429/211 |
| 2017/0133662 A1* | 5/2017 | Cui ....................... H01M 4/366 |

FOREIGN PATENT DOCUMENTS

| CN | 104332586 A | 2/2015 |
| CN | 105449165 A | 3/2016 |

(Continued)

OTHER PUBLICATIONS

Translation of CN 106340616A. Zhan et al. Jan. 18, 2017.*

(Continued)

*Primary Examiner* — Tracy M Dove
(74) *Attorney, Agent, or Firm* — Novick, Kim & Lee, PLLC; Allen Xue

(57) ABSTRACT

A method for preparing an ultrathin Li complex includes the steps of preparing an organic transition layer on a substrate in advance, and contacting the substrate having transition layer with molten Li in argon atmosphere with $H_2O \leq 0.1$ ppm and $O_2 \leq 0.1$ ppm. The molten Li spreads rapidly on the surface of the substrate to form a lithium thin layer. The ultrathin Li layer stores lithium on the current collector beforehand. It can be used as a safe lithium anode to inhibit dendrites.

2 Claims, 8 Drawing Sheets

(56) References Cited

FOREIGN PATENT DOCUMENTS

| | | | |
|---|---|---|---|
| CN | 106128791 A | 11/2016 | |
| CN | 106299246 A | 1/2017 | |
| CN | 106340616 A | 1/2017 | |
| CN | 106702441 A | 5/2017 | |
| CN | 106784635 A | 5/2017 | |
| CN | 106898753 A | 6/2017 | |
| CN | 107425175 A | 12/2017 | |

OTHER PUBLICATIONS

Zheng Liang et al., "Composite lithium metal anode by melt infusion of lithium into a 3D conducting scaffold with lithiophilic coating", Proc Natl Acad Sci, Mar. 15, 2016, vol. 113, No. 11, pp. 2862-2867.

Dingchang Lin et al., "Layered reduced graphene oxide with nanoscale interlayer gaps as a stable host for lithium metal anodes", Nature Nanotechnology, Mar. 21, 2016, vol. 11 (7), pp. 626-632.

Yayuan Liu et al., "Lithium-coated polymeric matrix as a minimum volume change and dendrite-free lithium metal anode", Nature Communications, Mar. 18, 2016, DOI: 10.1038/ncomms10992.

* cited by examiner

ULTRATHIN LITHIUM COMPOSITE AND PREPARATION METHOD AND USE THEREOF

TECHNICAL FIELD

The present invention belongs to the field of electrochemistry, specifically relates to a preparation method of ultrathin lithium metal and use thereof.

BACKGROUND ART

With the rapid development of portable electronic equipment and electric vehicles, the performance of lithium-ion batteries in energy storage has been increasingly demanded. Lithium has attracted attention of battery researchers as its extremely high theoretical capacity (3860 mA·h·g$^{-1}$) and the lowest redox potential, which has becoming the research hotspots in the next-generation secondary batteries. The main obstacles in the commercialization of lithium metal anode are the uneven deposition of lithium and the side reactions between lithium metal and the electrolyte, especially the lithium dendrites caused by the uneven deposition of lithium, which leads to not only a decreased Coulombic efficiency, but also the possibility of punctuation of the separator that causes short-circuit inside the battery, thereby inducing significant safety problems. Therefore, the safety design of lithium metal is of great importance during its application.

The commercial lithium, which still even has a thickness of 50 μm in the thinnest state, was chosen a thickness of 600 μm for cost reasons by universities and other research institutes. With the areal capacity matching of current cathode materials, the areal capacity of commercialized lithium is far excessive. In order to save lithium and solve the problems such as dendrite growth and low Coulombic efficiency during the cycling of lithium, electrodeposition was adopted to prepare the high-safety lithium anodes by many researchers in recent years. The study shows that the usage of porous current collectors would restrain the lithium dendrite to a certain extent. Some anode materials, such as Si/C materials, are expected to improve their performance if the prelithiation technology is used. The lithium needed in the prelithiation technology is generally thin (~3 mAh·cm$^{-2}$, the corresponding thickness is 15 μm). The combination of ultrathin Li metal and Si/C composite materials will make the Si/C anodes have wider application prospects. In addition, it is very important to realize the controllable preparation of ultrathin Li, since making it into a controllable Li layer will facilitate widely use thereof in electronic devices.

At present, the preparation of the lithium ribbon is mainly through the thermal melting method. CN104332586A has disclosed a production method of lithium ribbon, which includes the following steps: pre cooling a separator (S10): lowering the temperature of the separator in advance by a pre-cooling equipment; melting the lithium ingots (S20): increasing the temperature of the lithium ingot with a heating device, so that the solid lithium become molten lithium; coating the molten lithium (S30): applying the molten lithium onto the separator that has been pre-cooled; cooling the separator (S40): further decreasing the temperature of the battery separator coated with molten Li via a cooling device so as to solidify the molten Li into lithium ribbon. Simultaneously, an equipment for preparing lithium ribbon using the above method is also disclosed. By providing a method and equipment for manufacturing lithium ribbon to replace the traditional rolling production of ultrathin lithium ribbon, the problems of lithium ribbon discoloration and unevenness of thickness during the rolling process has been avoided, and thus a simple, efficient and reliable production of lithium ribbon has been achieved. In addition to heating and melting method, the lithium ribbon can also be prepared by electrodeposition. CN106702441A discloses a continuous electrodeposition method for preparing lithium ribbon, and the method comprises the following steps in order: A, pretreatment process: the metal was activated; B, electrodeposition of lithium with a constant current density: the current density was set 5-50 mA/cm$^2$ with time of 0.5-10 s, and then the current density was adjusted to the range of 0.02-1 mA·cm$^{-2}$ with a deposition time of 1-10 h; C, post-treatment: passivate the metal ribbon after electrodeposition to obtain metal lithium ribbon. The lithium metal ribbon is uniformly dense throughout. By adjusting the current density and the time of dipping into the solution, the thickness of the lithium could be controlled, which makes the process for the lithium ribbon of various thickness easily. However, the electrodeposition condition should be controlled very precisely. Compared with the thermal melting method, the required time is also longer, the process parameters are relatively complex, and the production efficiency is low.

The ultrathin lithium anodes prepared by a thermal melting method are facing the main problem of the poor wettability between molten lithium with many substrates, which limits the large-scale preparation and applications. In order to solve the problem of poor wettability between molten lithium and the substrate, Liang Z. et al. sputtered silicon on the substrate via CVD and used it as a lithiophilic coating to achieve spreading of molten lithium on foam copper and other substrates. Additionally, patent application CN106898753A discloses a silicon coated vertical graphene/lithium metal composite material and its preparation and application. The method comprises the following steps: sputtering a Si modified layer on the surface of vertical aligned graphene by magnetron sputtering technology, and Si@VG composite array structure was obtained, which improves the wettability between vertical graphene array and liquid metal lithium; heating the lithium metal at a temperature above 200° C. to a molten state, then after a full reaction of molten Li with the Si@VG array for 5-30 min, the Si@VG/Li composite lithium anode was obtained. Lin, D et al. realized the molten lithium infusion into the pores of the reduced graphene oxide with the help of O—H, C—H, C—O—C and other functional groups on the surface of the reduced graphene. Patent application CN106784635A discloses a preparation method of the composite lithium anode for solid-state battery. The method comprises infusing or depositing lithium in three-dimensional carbon materials or foamed porous materials to prepare lithium anode composite. Three-dimensional carbon materials and potassium hydroxide were mixed, and then was put into a tubular furnace at a temperature of 800° C. for 1 h under the nitrogen atmosphere, and the functional groups on three-dimensional carbon materials included C═C, C═N, C═O and N═N. Liu, Y. et al. sputter ZnO on the substrate by atomic layer deposition, thereby spread the molten Li onto the substrate via the reaction between ZnO and Li. The methods of ALD and CVD are not only costly but also complicated and tedious. According to the literature, it requires up to 50 times for deposition of ZnO via ALD, which consume serious costs of manpower and material resources. Although it is reported that rGO can directly infuse molten lithium into its internal pores, it is not universally applicable to other substrates, thus presenting a poor design ability. Patent application CN105449165A discloses a Li-rich electrode for lithium-ion battery and a preparation method thereof. During the Li-rich process, since the surface tension of molten lithium is large, the thickness of the Li-rich layer need to be controlled. Ceramic particles are added to the molten lithium, and the ceramic particles serve as pinning points in the molten lithium to prevent the tendency of the molten lithium becoming pellets. The ceramic materials are selected from alumina, titanium dioxide, silica, magnesium oxide, oxide skin, zirconium oxide, silicon nitride, aluminum phosphate etc. The invention has high requirements on the particle size and water content of the ceramic particles. At present, various interphases that have been reported are inorganic coatings, and most of the preparation processes need nanotechnology, such as CVD or ALD, possessing high cost and inconvenient for large-scale preparation. The further development of ultrathin lithium technology can not only solve the waste of lithium resources and security problems from the too thick Li, but also bring flexibly designed of lithium metal anode combining Li with porous collector, which could be used to the prelithiation technology for anodes and achieve controlled ultrathin Li preparation in electronic devices applications via patterning. This is of great significance. As a result, the development of a simple and universal method of preparing ultrathin lithium will have a far-reaching impact in the field of lithium metal batteries.

The present patent creatively coated the substrate with a transition layer of organic compounds to improve the wettability of molten Li on the substrate. Ultrathin Li anodes were obtained via controlling the parameters during the preparation. The obtained ultrathin lithium could not only be used as high safety anode and in prelithiation technology, but also be controllable for ultrathin Li preparation via patterning design to be applicable in electronic devices. The transition layer between the substrate and molten lithium shows universality for many substrates. The preparation process is simple and suitable for large-scale preparation, which has broad application prospects and advantages.

1. Liang, Z.; Lin, D.; Zhao, J.; Lu, Z.; Liu, Y.; Liu, C.; Lu, Y.; Wang, H.; Yan, K.; Tao, X.; Cui, Y, Composite lithium metal anode by melt infusion of lithium into a 3D conducting scaffold with lithiophilic coating. Proc Natl Acad Sci USA 2016, 113 (11), 2862-2867.
2. Lin, D.; Liu, Y; Liang, Z.; Lee, H. W.; Sun, J.; Wang, H.; Yan, K.; Xie, J.; Cui, Y, Layered reduced graphene oxide with nanoscale interlayer gaps as a stable host for lithium metal anodes. Nat Nanotechnol 2016, 11 (7), 626-632.
3. Liu, Y.; Lin, D.; Liang, Z.; Zhao, J.; Yan, K.; Cui, Y., Lithium-coated polymeric matrix as a minimum volume-change and dendrite-free lithium metal anode. Nat Commun. DOI: 10.1038/ncomms10992.

SUMMARY OF THE INVENTION

The purpose of the present invention is to provide a preparation method and use of an ultrathin lithium complex.

The invention provides a method for producing ultrathin lithium complex, which comprises the following steps: preparing an organic-transition layer on a substrate; and contacting the substrate having organic-transition layer with molten Li in argon atmosphere with $H_2O \leq 0.1$ ppm and $O_2 \leq 0.1$ ppm, thereby the molten Li spreads rapidly on the substrate to form an ultrathin Li layer.

According to the preparation method of the present invention, the transition layer is composed of an organic compound that is reactable with molten Li at a temperature range of 180-300° C., wherein the organic compound comprises one or more functional groups selected from the group consisting of hydroxyl, ester, carboxyl, aldehyde, ketone, sulfonic, sulfhydryl, phosphate, amino, nitro, sulfonyl, acylamino, acyl, carbonyl, sulphone, sulfoxide, cyano, isocyano, phosphine, etc; or the organic compound is one or more compounds selected from organosilicon compounds containing silicon and organic fluoro-compounds containing fluorine; or the organic compound is one or more compounds selected from polyvinyl alcohol, vitamin C, polyoxyethylene, polyethyleneglycol, glucose, phenolic resin, methyl-aminobenzoate, rosin glyceride, amino acetic acid, polyethylene oxide, citric acid, lactic acid, benzoic acid, salicylic acid, oxalic acid, phthalic acid, terephthalic acid, isophthalic acid, malic acid, cinnamic acid, ibuprofen, abietic acid, piperic acid, rosin glyceride, succinic acid, adipic acid, dibromosuccinic acid, dibromobutenedioic acid, ascorbic acid, nicotinic acid, phenol, polyethylenimide, benzamide, methyl benzamide, polyacrylamide, polyvinylpyrrolidone, benzene sulfonic acid, 2-naphthalene sulfonic acid, L-glutamic acid, ethyl orthosilicate, polyvinylidene fluoride, polytetrafluoroethylene, etc. Among them, the preferred transition layer was formed by one or several chemicals from polyvinylidene, polytetrafluoroethylene and polyethylenimide, which were in the form of a solution or an emulsion. For instance, the transition layer could be formed from a mixture solution of polyvinylidene fluoride and polyethylenimine, or polyvinylidene fluoride solution, or polytetrafluoroethylene emulsion, etc. One or more of the above compounds are dispersed in water or ethanol to form a homogeneous solution or an emulsion, depending on their dissolution characteristics. The concentration of the solution or emulsion is 0.1%-50%, and the preferred concentration is 1%-10%.

The transition layer in the above preparation method can be formed by coating a solution or an emulsion on the substrate, or by soaking the substrate into a solution or an emulsion, or by directly modifying the functional groups on the surface of the substrate through physical or chemical reactions. After volatilization and dryness of the solvent, the substrate is transferred to the argon atmosphere with the content of water $\leq 0.1$ ppm and oxygen $\leq 0.1$ ppm.

The substrate in the above preparation method can be selected from a porous substrate, a planar substrate, and a patterned transition layer substrate processed from a porous substrate or a planar substrate. There is no obvious distortion and decomposition for the substrate under a protective atmosphere at a temperature range of 180-300° C. The substrate can be chosen from a metal foam of Cu, Ni, Fe, Fe/Ni etc, or the substrate is selected from porous carbon substrates including porous graphite substrate, porous carbon fiber, carbon paper, carbon cloth, various carbon materials that were prepared by powder filtering, such as graphene, graphene oxide, single-walled carbon nanotubes and multiwalled carbon nanotube etc., or the substrate is a $TiO_2$ tube substrate with nano pores, or the substrate is a planar Cu, stainless steel or Ni, without micro-nano pore, or the substrate has a patterned transition layer on a planar substrate, so as to achieve the highly controllable preparation of ultrathin Li. The substrate is not limited to the type and pore size distribution, and possesses general applicability.

According to the preparation method of ultrathin Li, the time for contacting the transition layer with molten Li is 10-120 s, preferably 10-20 s. The temperature of the molten Li is 180-300° C. when contacting with the substrate, preferably 220-280° C. The thickness of the resulting ultrathin lithium is 5-50 and the optimum thickness is 10-30 The thickness of the lithium metal can be adjusted by controlling the contact time of the molten lithium and the foamed metals.

The ultrathin Li complex prepared by the method of the present invention comprises a basal layer, an ultrathin Li layer, and a carbon-containing substance between the basal layer and the ultrathin Li layer. The carbon-containing substance is formed by sintering the transition layer. In addition to the C element, the carbon-containing substance may also contain hydrogen, oxygen, nitrogen, sulfur, phosphorus, fluorine, silicon and other elements.

The present invention also provides three uses of the ultrathin Li complex: the ultrathin Li for high safety anodes, the ultrathin Li for anode prelithiation technology, and controllable preparation of an ultrathin Li layer through a patterned design of a transition layer on a substrate and applications in the large-scale electronic device.

When the prepared ultrathin lithium layer is used for a high safety lithium anode material, the anode material includes a porous current collector and ultrathin lithium metal. Since dendrite inhibitory effect of current collectors with large pores (up to hundreds of microns) is obviously reduced, a collector made of carbon fiber, graphite, or the copper substrate with the micro pores is adopted in combination with the prepared ultrathin lithium layer to serve as high safety anode materials, so as to effectively inhibit the dendrite. The lithium anode prepared in the present invention can be used for a lithium secondary battery. The preset lithium can not only meet the needs of the cathode material, but also rearrange in the micropore of the collector during the cycle, which restricts deposition of the lithium on the surface and formation of the dendrite, thus provides excellent long-term cycling stability to the lithium secondary battery.

The prepared ultrathin lithium can be used for the prelithiation technology for anode materials, such as a Si/C electrode. Quantitative and uniform ultrathin lithium can be combined with a Si/C anode to conduct prelithiation of the anodes. In the present invention, the ultrathin lithium layer with a thickness of 5-10 μm obtained on various substrates can be mechanically peeled off from the substrate and further be combined with a Si/C anode. Alternatively, a suitable current collector can be adopted as the substrate directly, and the resulting ultrathin Li complex could be combined with a Si/C anode to be applied in prelithiation technology for a Si/C anode. The areal capacity of the ultrathin Li layer is regulated by the thickness. Ultrathin Li layers with different thicknesses can be designed to be combined with Si/C anodes according to the actual needs, so as to improve the performance of Si/C anode and broaden its application prospects.

The prepared ultrathin Li layer can be designed by a patterned transition layer on the substrate to obtain a highly controlled ultrathin Li layer. The patterned transition layer can be designed in advance by ink-jet printing on different substrates, and then the patterned transition layer contacts with molten Li for 10-30 s. In the area without the transition layer, the molten lithium cannot spread onto the substrate, while for the area with the patterned transition layer, the molten lithium can spread on the substrate, thereby a highly controlled ultrathin Li layer can be obtained, which can be used in electronic devices and other fields.

Compared with the prior art, the preparation method for an ultrathin Li provided by the present invention has the advantages of a rich source of raw materials and low cost. By using coating or dip-moulding, the method is simple and suitable for large-scale application. In addition, the transition layer is universally adaptable for various substrates, such that the method has a high degree of practicability. The contacting time for the substrate with the molten Li is short, thus an ultrathin Li layer can be obtained. The ultrathin Li can be combined with a porous anode current collector to serve as a high safety lithium anode for secondary lithium battery. The ultrathin Li can also be applied directly to the prelithiation technology for anodes. Through patterned design of the transition layer on the substrate, a highly controllable ultrathin Li can also be obtained, which is useful in electronic devices. As a result, the ultrathin Li prepared in the present invention has a broad application prospect.

BEST MODE FOR CARRYING OUT THE INVENTION

The present invention is further explained in examples with specific embodiments, but it is not limited by the following examples. The reagents and materials used in the following examples, if there is no particular statement, can be obtained from commercial.

Example 1

Figure 1:
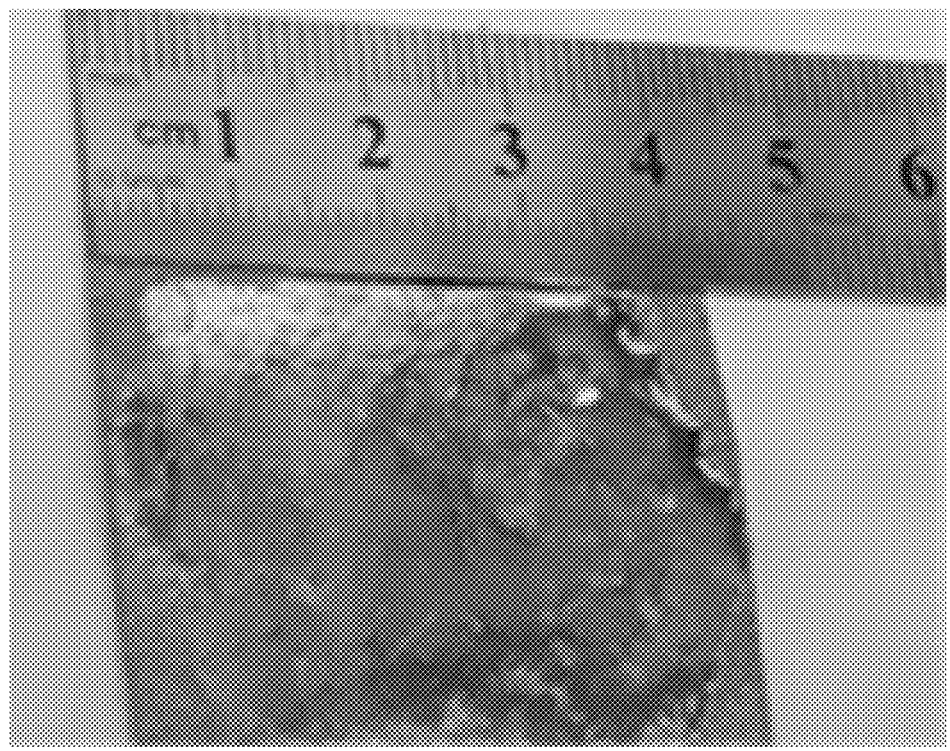
FIG. 1 is a photograph showing the wettability of molten Li on porous Cu foam substrate with a transition layer in Example 1.
Figure 2A:
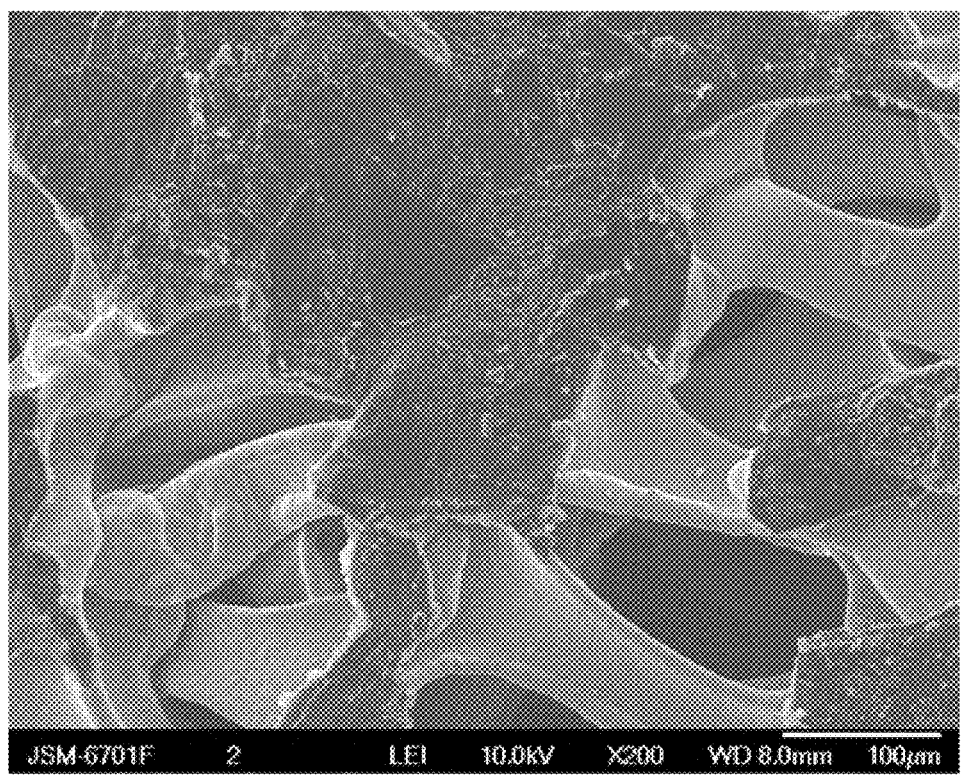
FIG. 2A is a Scanning Electron Microscopy (SEM) image of the ultrathin Li layer on Cu foam substrate with a transition layer in Example 1.
Figure 2B:
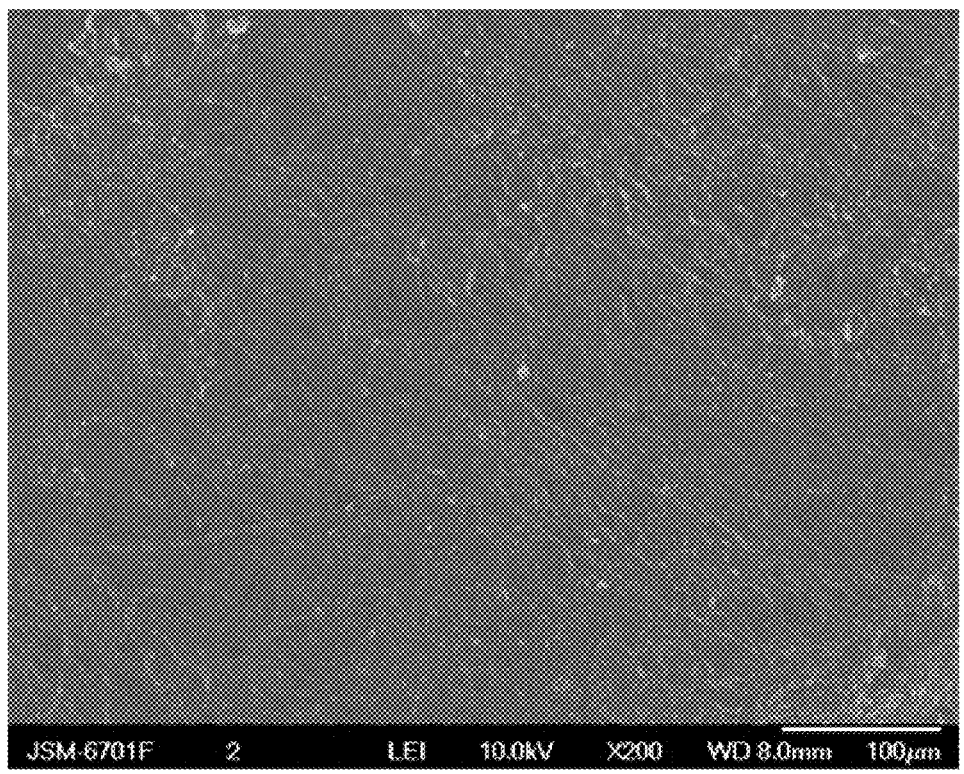
FIG. 2B is an SEM image at high magnitude of the ultrathin Li on Cu foam substrate with a transition layer in Example 1.
Figure 2C:
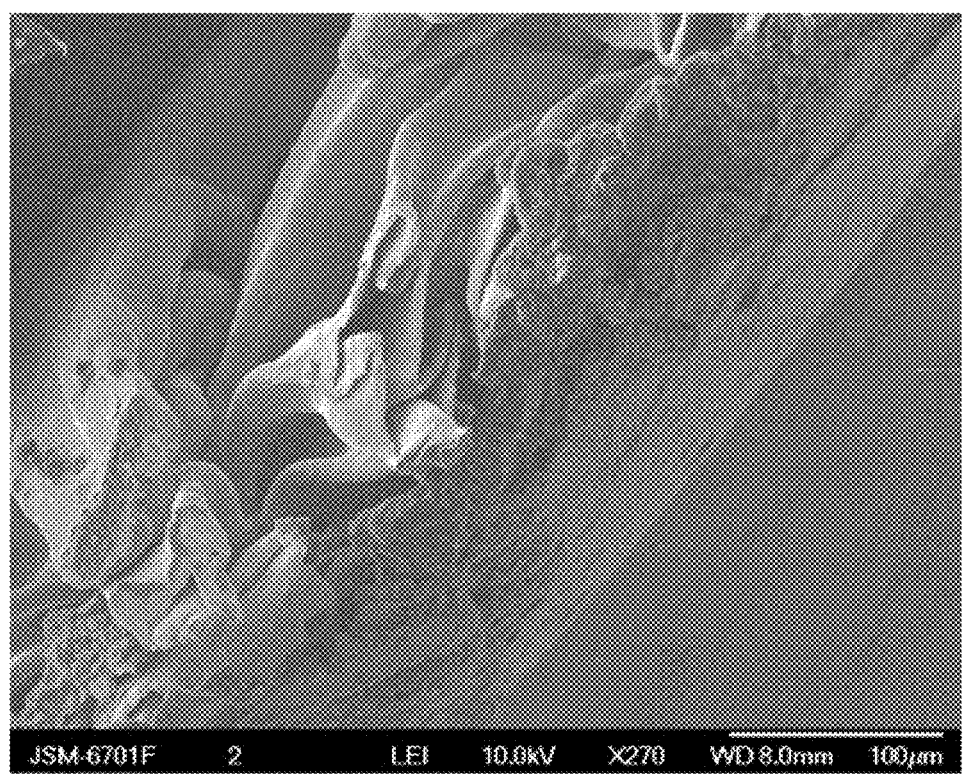
FIG. 2C is a cross-sectional SEM image of the ultrathin Li on the Cu foam substrate with a transition layer in Example 1.
Figure 2D:
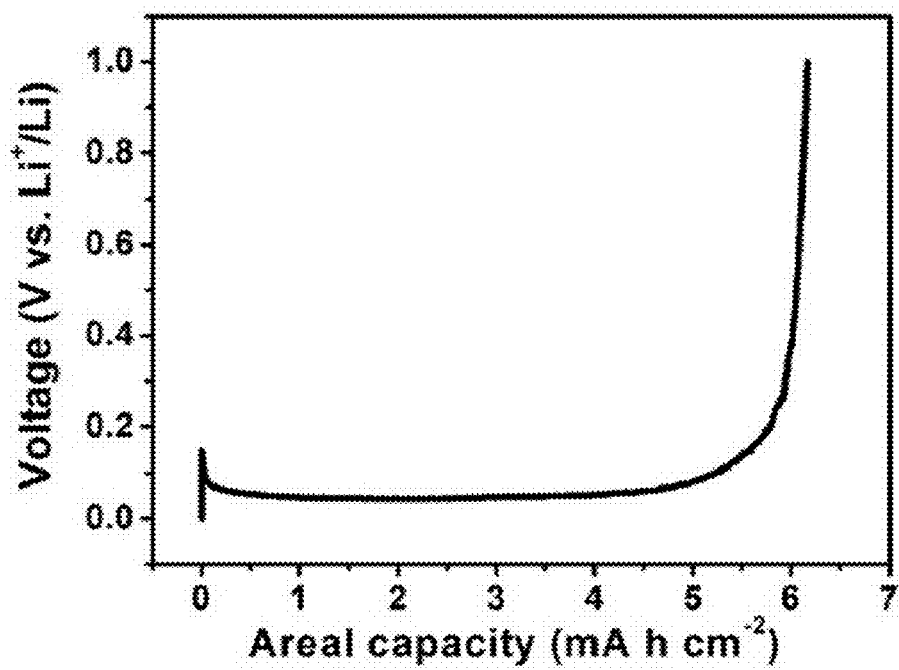
FIG. 2D is a plot showing the areal capacity of the ultrathin Li on the Cu foam substrate in Example 1.

Preparation of Ultrathin Li on Cu Foam Substrate 5 g abietic resin was weighed and dissolved in 95 g ethanol to form a homogeneous resin solution. A copper foam was soaked in the solution for 1 minute, and the solvent ethanol was fully volatilized and dried, thus a homogeneous transition layer was formed on the surface of the copper foam. The sample was transferred into an argon-filled glove box with an oxygen and moisture level <0.1 ppm. Li metal was heated to 250° C. in a stainless steel container to form molten Li, and then the Cu foam with transition layer contacted with molten Li for 20 s. The results show that after the contact of Cu foam with molten Li, the molten lithium spread quickly on the surface of the Cu foam with the transition layer, so as to form a relatively uniform ultrathin layer of lithium, as shown in FIG. 1. As can be seen from FIG. 1, the area of the lithium metal layer is relatively large, which can be obtained at one time. Comparing with the electrodeposited lithium in button cell, the preparation method is simple, efficient and practical. The morphology of the ultrathin Li anode was characterized and the areal capacity was measured. The morphology of the ultrathin Li on Cu foam was observed by using scanning electron microscope (SEM). The transition layer formed from the abietic resin solution (5 wt %) can make the metal lithium to generate an independent layer, and the molten Li cannot be detected in the copper foam, as shown in FIG. 2A and FIG. 2C. The thickness of the ultrathin Li layer is about 30 μm, which is illustrated in FIG. 2C. Referring to FIG. 2D, the capacity of the ultrathin Li layer is about 6 mAh·cm$^{-2}$ as measured by using electrochemical testing. A symmetrical battery was assembled using the ultrathin Li anode in combination with a commercial lithium sheet that was used as a counter electrode, and the polarization performance was measured. The polarization voltage finally stabilized at 40 mV after 100 cycles with a current density of 1 mA·cm$^{-2}$ and a capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in the present invention exhibits excellent performance as a lithium metal battery material.

Comparative Example 1

Figure 3:
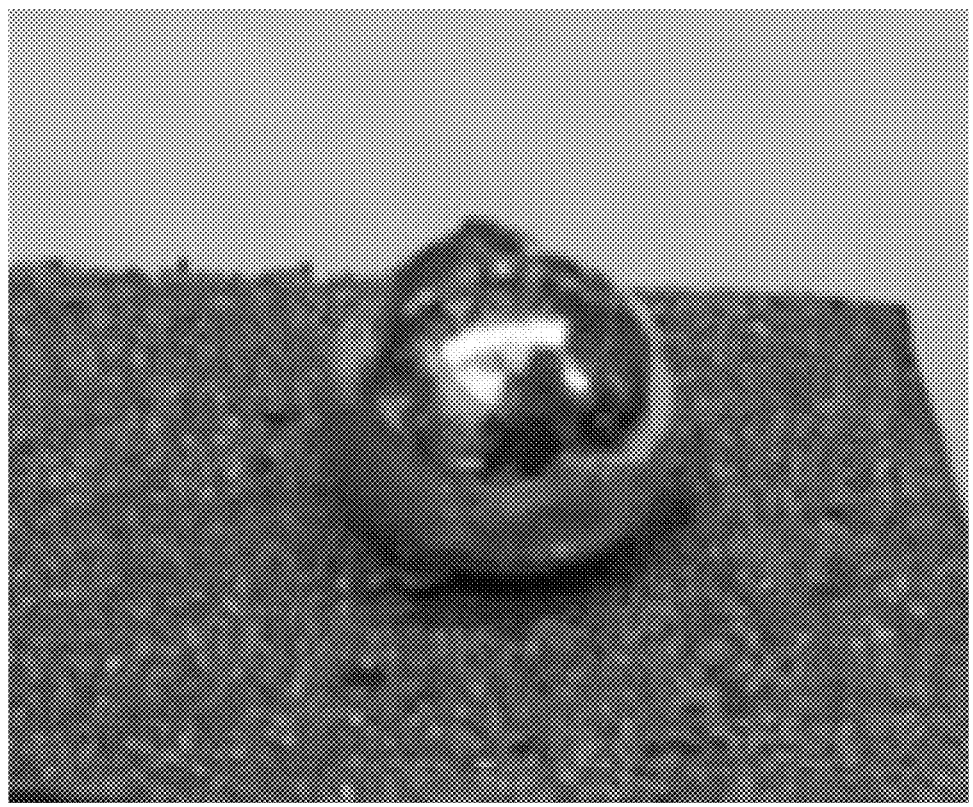
FIG. 3 is a photograph showing the poor wettability of molten Li on porous Cu foam substrate without a transition layer in Comparative Example 1.

Li metal was heated to 250° C. in a stainless steel container to form molten Li, then a Cu foam substrate without transition layer contacts with the molten Li for 20 s. The results show that the wettability of molten Li on Cu foam without a transition layer is relatively poor. As shown in FIG. 3, molten Li presents on the Cu foam substrate in form of spherical granules, which indicates a highly lithiophobic of molten Li on Cu substrate.

Example 2

Figure 4A:
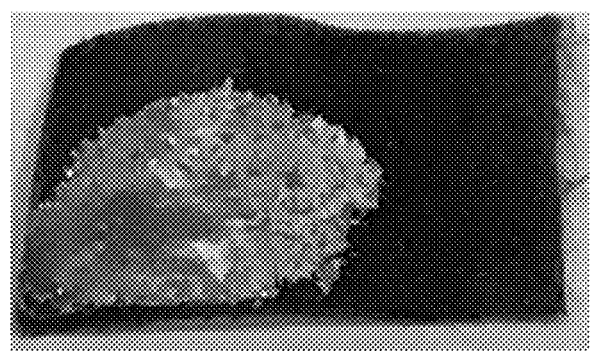
FIG. 4A is a photograph showing the wettability of molten Li on carbon fiber felt substrate with a transition layer in Example 2.

Preparation of Ultrathin Li on Carbon Felt Substrate 10 g citric acid was weighed and dissolved in 90 g ethanol to form a homogeneous solution. A carbon felt was soaked in the solution for 1 minute, and the solvent ethanol was fully volatilized and dried, thus a homogeneous transition layer was formed on the surface of the carbon felt. The sample was transferred into an argon-filled glove box with an oxygen and moisture level <0.1 ppm. Li metal was heated to 250° C. in a stainless steel container to form molten Li, and then the carbon felt with transition layer contacted with molten Li for 20 s. The results show that after the contact of carbon felt with molten Li, the molten lithium spread quickly on the surface of the carbon felt with the transition layer so as to form a relatively uniform ultrathin layer of lithium, as shown in FIG. 4A.

Figure 4B:
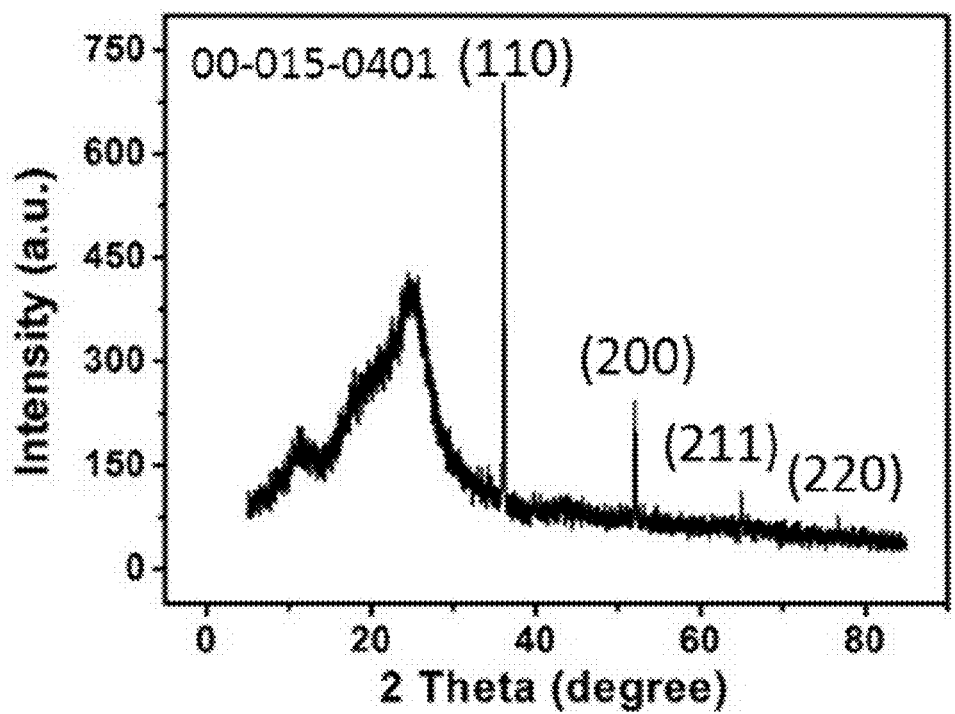
FIG. 4B is an X-Ray diffraction (XRD) diagram of the ultrathin Li on carbon fiber felt substrate in Example 2.

The crystal structure of the product was confirmed by the powder X-ray diffractometer (Rigaku DmaxrB, CuK ray), as shown in FIG. 4B. It can be seen from the XRD that there is no impurity peak beside the peaks of lithium and carbon felt, which indicates that the purity of the lithium metal is quite high.

Figure 5A:
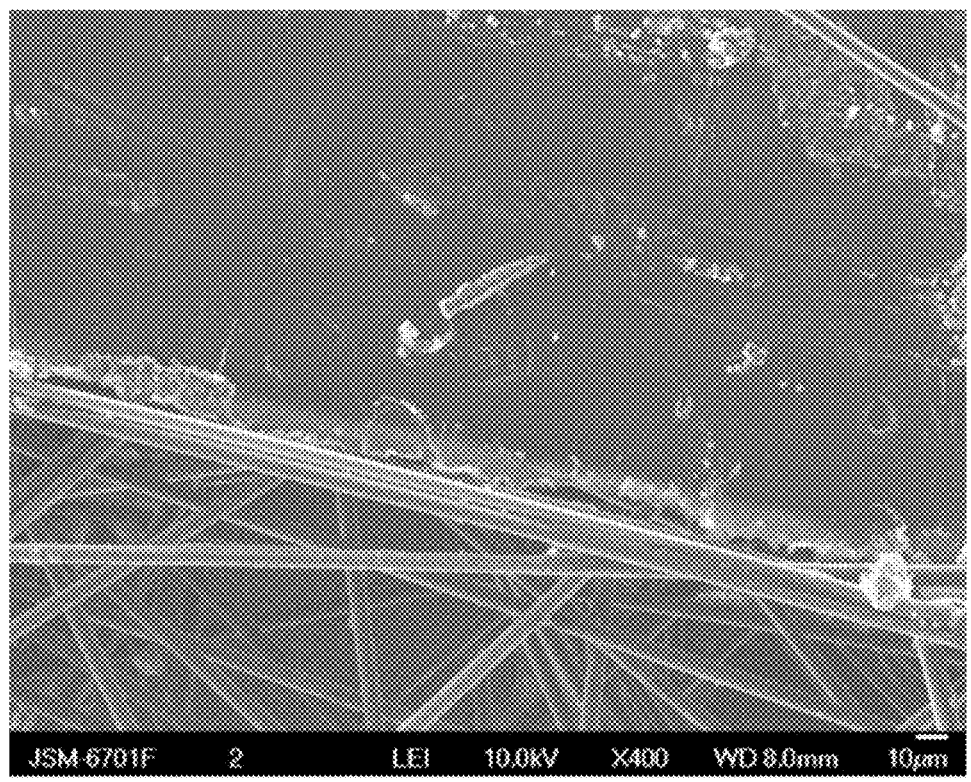
FIG. 5A is an SEM image of the ultrathin Li on carbon fiber felt substrate with a transition layer in Example 2.
Figure 5B:
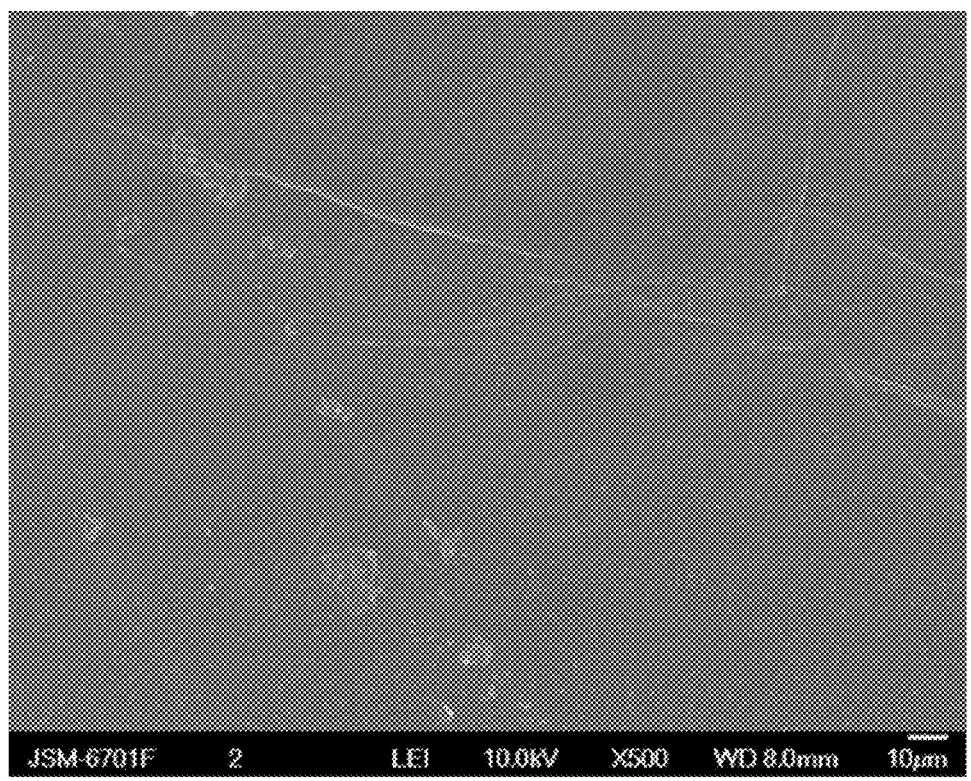
FIG. 5B is an SEM image at high magnitude of the ultrathin Li on carbon fiber felt substrate with a transition layer in Example 2.
Figure 5C:
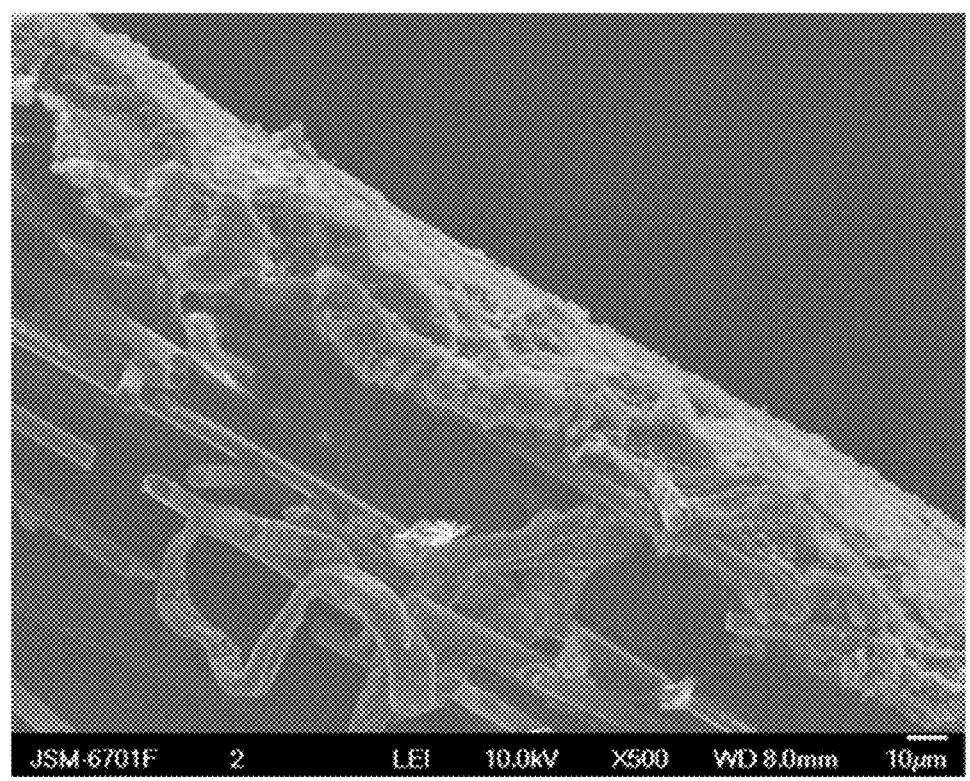
FIG. 5C is a cross-sectional SEM image of the ultrathin Li on carbon fiber felt substrate with a transition layer in Example 2.
Figure 5D:
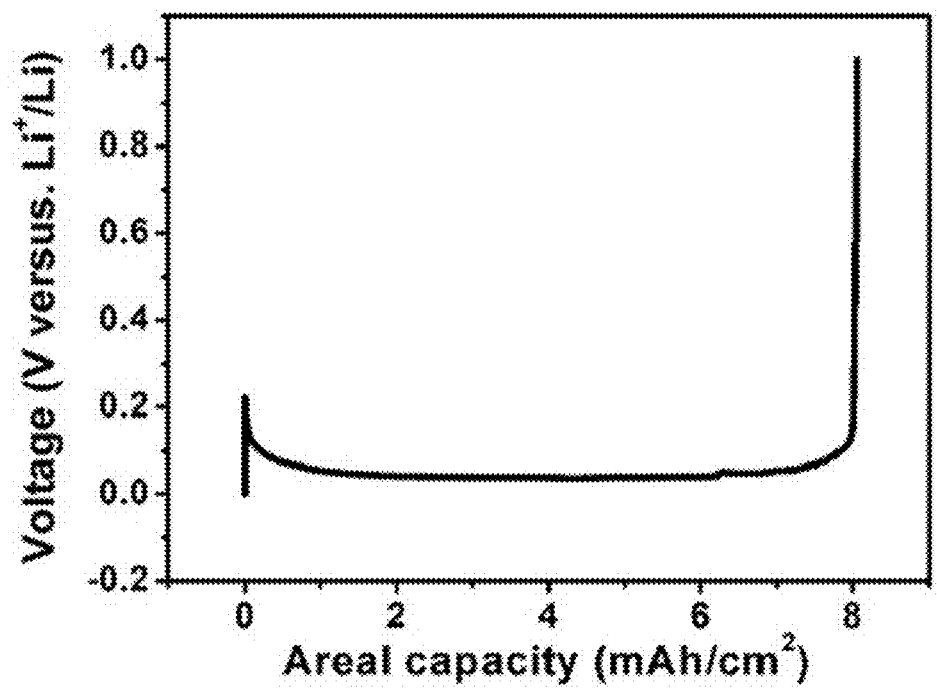
FIG. 5D is a plot showing the areal capacity of the ultrathin Li on carbon fiber felt substrate in Example 2.

The morphology of ultrathin Li anode was characterized and the areal capacity was measured. The morphology of ultrathin Li on Cu foam was observed by using scanning electron microscope (SEM). The transition layer formed from the citric acid solution (5 wt %) can make the metal lithium to generate an independent layer, and the molten Li cannot be detected in the carbon felt, as shown in FIG. 5A and FIG. 5C. The thickness of the ultrathin Li layer is about 40 μm, which is illustrated in FIG. 5C. Referring to FIG. 5D, the capacity of the ultrathin Li layer is about 8 mAh·cm$^{-2}$ as measured by using electrochemical testing. A symmetrical battery was assembled using the ultrathin Li anode in combination with a commercial lithium sheet that was used as a counter electrode, and the polarization performance was measured. The polarization voltage finally stabilized at 30 mV after 100 cycles, with a current density of 1 mA·cm$^{-2}$ and a capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in the present invention exhibits excellent performance as a lithium metal battery material.

Comparative Example 2

Figure 6:
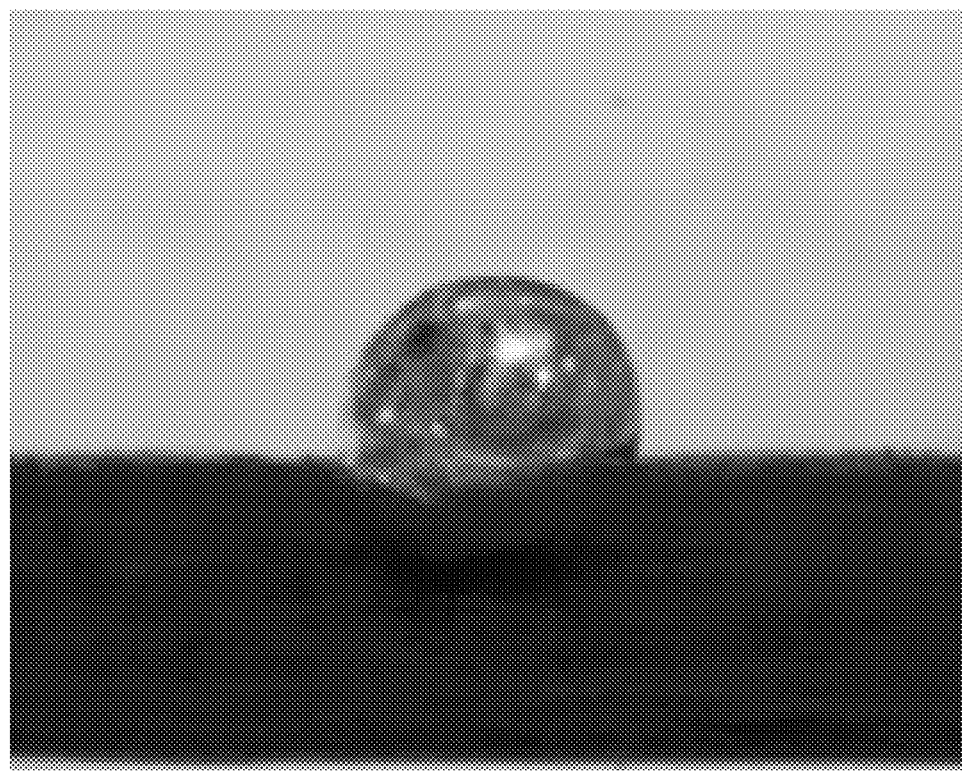
FIG. 6 is a photograph showing the poor wettability of molten Li on carbon fiber felt substrate without a transition layer in Comparative Example 2.

Li metal was heated to 250° C. in a stainless steel container to form molten Li, and then a carbon felt without transition layer contacted with the molten Li for 20 s. The results show that the wettability of molten Li on carbon felt without a transition layer is relatively poor. As shown in FIG. 6, the contact angles of molten Li on carbon felt are relatively large (>90°), which indicates a highly lithiophobic of molten Li on carbon felt.

Example 3

Figure 7:
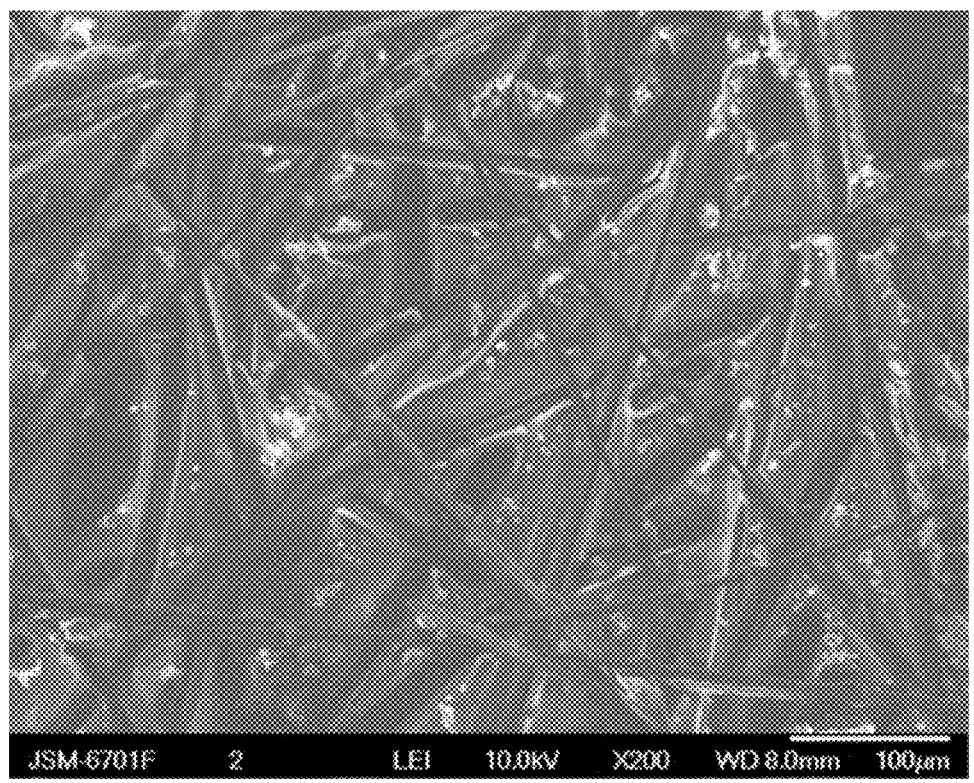
FIG. 7 is an SEM image of the ultrathin Li infused into the inside pores of the carbon fiber felt in Example 3.

Preparation of Ultrathin Li Infused into Carbon Felt 30 g citric acid was weighed and dissolved in 70 g water to form a homogeneous solution. A carbon felt was soaked in the solution for 1 minute, and the solvent water was fully volatilized and dried, thus a homogeneous transition layer was formed on the surface and inside of the carbon felt. The sample was transferred into an argon-filled glove box with an oxygen and moisture level <0.1 ppm. Li metal was heated to 250° C. in a stainless steel container to form molten Li, and then the carbon felt with transition layer contacted with the molten Li for 20 s. As shown in FIG. 7, the molten Li infused into the carbon felt so as to generate a high areal capacity of up to 30 mAh·cm$^{-2}$ for molten Li. A symmetrical battery was assembled using the Li anode in combination with a commercial lithium sheet that was used as a counter electrode, and the polarization performance was measured. The polarization voltage finally stabilized at 30 mV after 100 cycles with a current density of 1 mA cm$^{-2}$ and a capacity of 1 mAh·cm$^{-2}$. When a symmetrical battery is assembled by two commercialized lithium sheets as the electrode materials, the polarization voltage stabilizes at 80 mV under the same current density. The comparison shows that the ultrathin Li prepared in the present invention exhibits excellent performance as a lithium metal battery material. Compared with Example 2, the higher the concentration of the functional group-containing material in the transition layer is, the thicker the lithium layer in unit time can be obtained under the same preparation condition.

Example 4

Preparation of Ultrathin Li Formed onto Carbon Felt 20 g lactic acid was weighed and dissolved in 80 g water to form a homogeneous solution. A layer of the solution was coated on the surface of a carbon felt, and the solvent water was fully volatilized and dried before the substrate was transferred into an argon-filled glove box with an oxygen and moisture level <0.1 ppm. Li metal was heated to 250° C. in a stainless steel container to form molten Li, and then the carbon felt with transition layer contacted with molten Li for 20 s. The metal lithium generated an independent layer, and the molten Li could not be detected in the carbon felt. The thickness of the Li layer is about 30 and the areal capacity is about 6 $mAh·cm^{-2}$. Compared with Example 2, upon altering the type of the transition layer and controlling the concentration of the solution, a good wettability can also be achieved. A symmetrical battery was assembled using the prepared Li complex in combination with a commercial lithium sheet, and the polarization performance was measured. The polarization voltage finally stabilized at 50 mV after 100 cycles with a current density of 1 $mA·cm^{-2}$ and a capacity of 1 $mAh·cm^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 5

Preparation of Li with a Thickness of 30 μm Formed onto Carbon Felt 10 g citric acid was weighed and dissolved in 90 g ethanol to form a homogeneous solution. A carbon felt was soaked in the solution for 1 minute, and the solvent ethanol was fully volatilized and dried, thus a uniform transition layer was coated on the surface of the carbon felt. Then the substrate was transferred into an argon-filled glove box with an oxygen and moisture level <0.1 ppm. Li metal was heated to 250° C. in a stainless steel container to form molten Li, and then the carbon felt with transition layer contacted with the molten Li for 60 s. The thickness of the resulting ultrathin Li layer is about 30 and the areal capacity is about 6 $mAh·cm^{-2}$. Compared with Example 2, the thickness could also be controlled by controlling the contacting time. A symmetrical battery was assembled using the prepared Li complex in combination with a commercial lithium sheet, and the polarization performance was measured. The polarization voltage finally stabilized at 30 mV after 100 cycles with a current density of 1 $mA\ cm^{-2}$ and a capacity of 1 $mAh·cm^{-2}$. Compared with Example 3, the polarization voltage varies not very much, since the factors determining the polarization voltage are mainly related to the type of the transition layer. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 6

Preparation of Ultrathin Li on a Planar Cu Substrate 5 g citric acid was weighed and dissolved in 94 g ethanol to form a homogeneous solution. Then 1 g phenolic resin was added, and the solution was stirred evenly for using as the source of the transition layer. A layer of the solution was coated on the surface of a planar Cu substrate. After natural drying, it was put into a vacuum drying box at 80° C. for fully dryness. The planar Cu substrate coated with transition layer was transferred into an argon-filled glove box with an oxygen and moisture level <0.1 ppm. Li metal was heated to 250° C. in a stainless steel container to form molten Li, and then the planar Cu with transition layer contacted with molten Li for 10 s. The thickness of the resulting Li layer is about 10 μm, and the areal capacity is about 2 $mAh·cm^{-2}$. A symmetrical battery was assembled using the prepared Li complex in combination with a commercial lithium sheet, and the polarization performance was measured. The polarization voltage finally stabilized at 50 mV after 100 cycles with a current density of 1 $mA\ cm^{-2}$ and a capacity of 1 $mAh·cm^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 7

Preparation of Ultrathin Li on Planar Cu Substrate with Imide-Based Organic Matter as a Transition Layer 1 g polyethyleneimine (PEI) was weighed and dissolved in 99 g ethanol to form a homogeneous PEI solution. The solution was stirred evenly to serve as the source of the transition layer. A layer of the solution was coated on the surface of a planar Cu substrate. After natural drying, it was put into a vacuum drying box at 40° C. for fully dryness. The planar Cu substrate coated with the transition layer was transferred into an argon-filled glove box with an oxygen and moisture level <0.1 ppm. Li metal was heated to 250° C. in a stainless steel container to form molten Li, and then the planar Cu with transition layer contacted with molten Li for 15 s. The thickness of the resulting Li layer is about 7.5 μm, and the areal capacity is about 1.5 $mAh·cm^{-2}$. A symmetrical battery was assembled using the prepared Li complex in combination with a commercial lithium sheet, and the polarization performance was measured. The polarization voltage finally stabilized at 35 mV after 100 cycles with a current density of 1 $mA\ cm^{-2}$ and a capacity of 1 $mAh·cm^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 8

Preparation of Ultrathin Li on Planar Cu Substrate with Benzoic Acid as a Transition Layer 3 g benzoic acid was weighed and dissolved in 97 g ethanol to form a homogeneous solution for using as the source of the transition layer. A layer of the solution was coated on the surface of a planar Cu substrate. After natural drying, it was put into a vacuum drying box at 80° C. for fully dryness. The planar Cu substrate coated with the transition layer was transferred into an argon-filled glove box with an oxygen and moisture level <0.1 ppm. Li metal was heated to 250° C. in a stainless steel container to form molten Li, and then the planar Cu with transition layer contacted with molten Li for 10 s. The thickness of the resulting Li layer is about 10 μm, and the areal capacity is about 2 mAh·cm$^{-2}$. A symmetrical battery was assembled using the prepared Li complex in combination with a commercial lithium sheet, and the polarization performance was measured. The polarization voltage finally stabilized at 55 mV after 100 cycles with a current density of 1 mA·cm$^{-2}$ and a capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 9

Preparation of Ultrathin Li on Planar Cu Substrate with Rosin Glyceride as a Transition Layer 3 g rosin glyceride was weighed and dissolved in 97 g ethanol to form a homogeneous solution for using as the source of the transition layer. A layer of the solution was coated on the surface of a planar Cu substrate. After natural drying, it was put into a vacuum drying box at 80° C. for fully dryness. The planar Cu substrate coated with the transition layer was transferred into an argon-filled glove box with an oxygen and moisture level <0.1 ppm. Li metal was heated to 250° C. in a stainless steel container to form molten Li, and then the planar Cu with transition layer contacted with molten Li for 10 s. The thickness of the Li layer is about 10 μm, and the areal capacity is about 2 mAh·cm$^{-2}$. A symmetrical battery was assembled using the prepared Li complex in combination with a commercial lithium sheet, and the polarization performance was measured. The polarization voltage finally stabilized at 40 mV after 100 cycles with a current density of 1 mA·cm$^{-2}$ and a capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 10

Preparation of Ultrathin Li on Planar Cu Substrate with Methyl Anthranilate as a Transition Layer 3 g methyl anthranilate was weighed and dissolved in 97 g ethanol to form a homogeneous solution for using as the source of the transition layer. A layer of the solution was coated on the surface of a planar Cu substrate. After natural drying, it was put into a vacuum drying box at 80° C. for fully dryness. The planar Cu substrate coated with the transition layer was transferred into an argon-filled glove box with an oxygen and moisture level <0.1 ppm. Li metal was heated to 250° C. in a stainless steel container to form molten Li, and then the planar Cu with transition layer contacted with molten Li for 10 s. The thickness of the Li layer is about 10 μm, and the areal capacity is about 2 mAh·cm$^{-2}$. A symmetrical battery was assembled using the prepared Li complex in combination with a commercial lithium sheet, and the polarization performance was measured. The polarization voltage finally stabilized at 30 mV after 100 cycles with a current density of 1 mA cm$^{-2}$ and a capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 11

Preparation of Ultrathin Li on Planar Cu Substrate with 2 Naphthalenesulfonic Acid as a Transition Layer 3 g naphthalenesulfonic acid was weighed and dissolved in 97 g ethanol to form a homogeneous solution for using as the source of the transition layer. A layer of solution was coated on the surface of a planar Cu substrate. After natural drying, it was put into a vacuum drying box at 80° C. for fully dryness. The planar Cu substrate coated with the transition layer was transferred into an argon-filled glove box with an oxygen and moisture level <0.1 ppm. Li metal was heated to 250° C. in a stainless steel container to form molten Li, and then the planar Cu with transition layer contacted with molten Li for 10 s. The thickness of the Li layer is about 15 μm, and the areal capacity is about 3 mAh·cm$^{-2}$. A symmetrical battery was assembled using the prepared Li complex in combination with a commercial lithium sheet, and the polarization performance was measured. The polarization voltage finally stabilized at 55 mV after 100 cycles with a current density of 1 mA·cm$^{-2}$ and a capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 12

Preparation of Ultrathin Li on Planar Cu Substrate with Polyvinyl Alcohol as a Transition Layer 3 g polyvinyl alcohol was weighed and dissolved in 97 g ethanol to form a homogeneous solution for using as the source of the transition layer. A layer of the solution was coated on the surface of a planar Cu substrate. After natural drying, it was put into a vacuum drying box at 80° C. for fully dryness. The planar Cu substrate coated with the transition layer was transferred into an argon-filled glove box with an oxygen and moisture level <0.1 ppm. Li metal was heated to 250° C. in a stainless steel container to form molten Li, and then the planar Cu with transition layer contacted with molten Li for 10 s. The thickness of the Li layer is about 20 μm, and the areal capacity is about 4 mAh·cm$^{-2}$. A symmetrical battery was assembled using the prepared Li complex in combination with a commercial lithium sheet, and the polarization performance was measured. The polarization voltage finally stabilized at 50 mV after 100 cycles, with the current density of 1 mA cm$^{-2}$ and the capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 13

Preparation of Ultrathin Li on Planar Cu Substrate with a Fluorine-Containing Organic Compound as a Transition Layer 3 g polyvinylidene fluoride was weighed and dissolved in 97 g ethanol to form a homogeneous solution for using as the source of the transition layer. A layer of the solution was coated on the surface of planar Cu substrate. After natural drying, it was put into a vacuum drying box at 80° C. for fully dryness. The planar Cu substrate coated with the transition layer was transferred into an argon-filled glove box with an oxygen and moisture level <0.1 ppm. Li metal was heated to 250° C. in a stainless steel container to form molten Li, and then the planar Cu with transition layer contacted with molten Li for 10 s. The thickness of the Li layer is about 15 μm, and the areal capacity is about 3 mAh·cm$^{-2}$. A symmetrical battery was assembled using the prepared Li complex in combination with a commercial lithium sheet, and the polarization performance was measured. The polarization voltage finally stabilized at 25 mV after 100 cycles, with a current density of 1 mA cm$^{-2}$ and a capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 14

Preparation of Ultrathin Li on Planar Cu Substrate with a Mixture of a Fluorine-Containing Organic Compound and an Imide Based Polymer as a Transition Layer 2 g polyvinylidene fluoride and 1 g PEI were weighed and dissolved in 97 g N-methyl-2-pyrrolidone (NMP) to form a homogeneous solution for using as the source of the transition layer. A layer of the solution was coated on the surface of a planar Cu substrate. After natural drying, it was put into a vacuum drying box at 80° C. for fully dryness. The planar Cu substrate coated with the transition layer was transferred into an argon-filled glove box with an oxygen and moisture level <0.1 ppm. Li metal was heated to 250° C. in a stainless steel container to form molten Li, and then the planar Cu with transition layer contacted with molten Li for 10 s. The thickness of the Li layer is about 15 μm, and the areal capacity is about 3 mAh·cm$^{-2}$. A symmetrical battery was assembled using the prepared Li complex in combination with a commercial lithium sheet, and the polarization performance was measured. The polarization voltage finally stabilized at 20 mV after 100 cycles with a current density of 1 mA·cm$^{-2}$ and a capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 15

Preparation of Ultrathin Li on Planar Cu Substrate with a Mixture of Polyvinylidene Fluoride and Benzoic Acid as a Transition Layer 2 g polyvinylidene fluoride and 1 g benzoic acid were weighed and dissolved in 97 g NMP to form a homogeneous solution for using as the source of the transition layer. A layer of solution was coated on the surface of a planar Cu substrate. After natural drying, it was put into a vacuum drying box at 80° C. for fully dryness. The planar Cu substrate coated with the transition layer was transferred into an argon-filled glove box with an oxygen and moisture level <0.1 ppm. Li metal was heated to 250° C. in a stainless steel container to form molten Li, and then the planar Cu with transition layer contacted with molten Li for 10 s. The thickness of the Li layer is about 15 μm, and the areal capacity is about 3 mAh·cm$^{-2}$. A symmetrical battery was assembled using the prepared Li complex in combination with a commercial lithium sheet, and the polarization performance was measured. The polarization voltage finally stabilized at 30 mV after 100 cycles with a current density of 1 mA·cm$^{-2}$ and a capacity of 1 mAh·cm$^{-2}$. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

Example 16

Preparation of Ultrathin Li on Planar Cu Substrate with Polytetrafluoroethylene Emulsion as a Transition Layer A polytetrafluoroethylene emulsion with a concentration of 30% was used as the source of the transition layer. A layer of the emulsion was coated on the surface of a planar Cu substrate. After natural drying, it was put into a vacuum drying box at 80° C. for fully dryness. The planar Cu substrates coated with the transition layer were transferred into an argon-filled glove box with an oxygen and moisture level <0.1 ppm. Li metal was heated and held at 180, 200, 220, 240, 260, 280 and 300° C. respectively in a stainless steel container to form molten Li, then the planar Cu with transition layer contacted with molten Li for 20 s. The thickness of the Li layers is in the range of 5-20 μm. The thickness of the lithium layer obtained at 180° C. and 200° C. is about 5 μm, and the thickness of the lithium layer is about 10 μm at 220° C., 240° C. and 260° C. The thickness of the lithium layer obtained at 280° C. is about 20 μm, and the thickness of the lithium layer obtained at 300° C. is about 15 μm. This is because the melting rate of the transition layer and the reaction activity increased with the elevation of temperature, which results in an accelerated spreading rate of molten lithium. However, when the temperature is increased to a certain extent, the reaction rate between the transition layer and the molten lithium is accelerated, the decomposition rate of transition layer increases, and the content of effective transition layer is reduced. Therefore, the temperature of the molten lithium has an important effect on the control of the thickness of the ultrathin lithium layer. A symmetrical battery was assembled using the prepared Li complex in combination with a commercial lithium sheet at 260° C. with a capacity of 2 mA·h·cm$^{-2}$, and the polarization performance was measured. The polarization voltage finally stabilized at 20 mV after 100 cycles with a current density of 1 mA·cm$^{-2}$ and a capacity of 1 mAh·cm'. When a symmetrical battery is assembled with two commercial lithium sheets as the electrode materials, the polarization voltage stabilizes at 80 mV under the same current density. The comparison shows that the ultrathin Li prepared in this invention exhibits excellent performance as a lithium metal battery material.

TABLE 1

Performance of products in the examples

| Number | Substrate | Transition layer | Contact | Wettability | Polarization voltage |
|---|---|---|---|---|---|
| Example 1 | Cu foam | abietic resin (5 wt %) | 20 s | good | 40 mV |
| Comparative Example 1 | Cu foam | None | 20 s | poor | — |
| Example 2 | Carbon felt | citric acid (10 wt %) | 20 s | good | 30 mV |
| Comparative Example 2 | Carbon | None | 20 s | poor | — |
| Example 3 | Carbon felt | citric acid (30 wt %) | 20 s | good | 30 mV |
| Example 4 | Carbon felt | lactic acid (20 wt %) | 20 s | good | 50 mV |
| Example 5 | Carbon felt | citric acid (10 wt %) | 60 s | good | 30 mV |
| Example 6 | Planar Cu | Citric acid (5 wt %) | 10 s | good | 50 mV |
| Example 7 | Planar Cu | PEI (1 wt %) | 10 s | good | 35 mV |
| Example 8 | Planar Cu | benzoic acid (3 wt %) | 10 s | good | 55 mV |
| Example 9 | Planar Cu | rosin and glycerol ester (3 wt %) | 10 s | good | 40 mV |
| Example 10 | Planar Cu | methyl anthranilate (3 wt %) | 10 s | good | 30 mV |
| Example 11 | Planar Cu | naphthalenesulfonic acid (3 wt %) | 10 s | good | 55 mV |
| Example 12 | Planar Cu | Polyvinyl alcohol (3 wt %) | 10 s | good | 50 mV |
| Example 13 | Planar Cu | PVDF (3 wt %) | 10 s | good | 25 mV |
| Example 14 | Planar Cu | PVDF (2 wt %) and PEI (1 wt %) | 20 s | good | 20 mV |
| Example 15 | Planar Cu | PVDF (2 wt %) and benzoic acid (1 wt %) | 10 s | good | 30 mV |
| Example 16 | Planar Cu | PVDF emulsion (30 wt %) | 20 s | good | 20 mV |

From the above-mentioned examples, it is clear that there are many factors that influence the thickness of ultrathin lithium layer, including the concentration of the transition solution, the type of the transition layer solution, the contact time between molten lithium and the transition layer, and the temperature of molten lithium. The higher the concentration of the transition layer is, the higher the wettability of the molten lithium on the substrate can be achieved, and thereby the thickness of the lithium layer increases. An independent ultrathin metal lithium layer can be obtained by controlling the concentration of the solution for forming the transition layer. The Li complex prepared according to the present invention can be used as anode in secondary lithium battery, or can also be used in the prelithiation technology for anodes. Through the patterned design of the transition layer on the substrate, a highly controllable ultrathin Li can be obtained, which is useful in electronic devices and has a broad application prospect and a profound influence on the large-scale application of lithium metal.

In conclusion, a universal method for preparing ultrathin lithium and its application is provided via the preparation of an organic transition layer on various substrates for improving the wettability of molten Li. The preparation method of the invention is easy to control, and the transition layer has the advantages of a wide range of raw materials and a low cost. The ultrathin lithium layer prepared in the present invention can either be separated from the substrate or be combined with a current collector, which is useful in lithium metal secondary battery for saving lithium metal consumption and inhibiting lithium dendrites. The ultrathin Li prepared in the present invention can also be used in the prelithiation technology for anodes. Furthermore, controllable ultrathin Li can be obtained through patterned design of the transition layer on the substrate, for further application in electronic devices. As the method is simple and feasible, it is applicable to many substrates. The transition layer can be selected in a wide range with a low cost, thus the method is suitable for large-scale production and has broad application prospects.

The above contents are only preferred examples of the invention and are not used to restrict the scope of the invention. According to the main conception and spirit of the invention, those skilled in the field can easily adapt or modify the examples. As a result, the scope of the invention shall be based on the protection scope requested by the claims.

The invention claimed is:
1. A method for forming a lithium layer, comprising:
   coating a mixture solution of polyvinylidene fluoride and polyethyleneimine on a piece of planar copper substrate to form an organic transition layer on the substrate; and
   contacting the piece of planar copper substrate having the organic transition layer with a molten lithium in an argon atmosphere having $H_2O \leq 0.1$ ppm and $O_2 \leq 0.1$ ppm for 10-120 s at a temperature of the molten lithium of 180-300° C., thereby spreading molten lithium on the substrate to form the lithium layer having a thickness of 5-50 μm, and
   peeling the lithium layer off the piece of planar copper substrate.

2. The method according to claim 1, wherein the mixture solution of polyvinylidene fluoride and polyethyleneimine comprises a solvent of N-methyl-2-pyrrolidone.

\* \* \* \* \*